United States Patent Office 3,470,218
Patented Sept. 30, 1969

3,470,218
NEW 2-SUBSTITUTED ESTROGENIC STEROIDS
Basil S. Farah, Elma, N.Y., assignor to Allied Chemical Corporation, New York, N.Y., a corporation of New York
No Drawing. Filed Dec. 27, 1966, Ser. No. 604,636
Int. Cl. C07c *169/06, 169/08;* A61k *17/00*
U.S. Cl. 260—397.5                                    6 Claims

ABSTRACT OF THE DISCLOSURE

New 2-substituted estrogenic steroids having the formula $$\text{OH}-\underset{\underset{CF_2X}{|}}{\overset{\overset{CF_2Y}{|}}{C}}-\text{St}$$

wherein St is a steroid radical of the estrogenic steroid series having an aromatic A ring, a hydroxy group at the 3-position, and a free valence in the 2-position and wherein X and Y are independently fluorine or chlorine are prepared by reacting a steroid of the estrogenic steroid series having an available 2-position with a hexahaloacetone of the formula $CO(CF_2X)(CF_2Y)$ wherein X and Y are as stated above.

---

This invention relates to new steroid compounds. More particularly, it relates to, and has for its object the provision of, new, physiologically active 2-substituted estrogenic steroids wherein the substituent is a 2-hydroxy-perhalo-2-isopropyl group, and methods for their preparation.

The new 2-substituted estrogenic steroids of this invention may be represented by the general formula $$\text{OH}-\underset{\underset{CF_2X}{|}}{\overset{\overset{CF_2Y}{|}}{C}}-\text{St}$$

wherein St is a steroid radical of the estrogenic steroid series characterized by an aromatic A ring, a hydroxy group at the 3 position, and a free valence in the 2 position, and wherein X and Y are members selected from the group consisting of fluorine and chlorine.

The novel 2-substituted estrogenic steroids of this invention may be prepared by reacting a steroid of the estrogenic steroid series having an aromatic A ring, a hydroxy group at the 3 position, and a free 2 position, with a hexahaloacetone compound having the general formula $$CO(CF_2X)(CF_2Y)$$

wherein X and Y are members selected from the group consisting of fluorine and chlorine, under non-catalytic conditions, or in the presence of a sulfonic acid catalyst.

The estrogenic steroid and the hexahaloacetone react only at 1:1 molar ratio, and the substitution takes place at the 2 position, as illustrated by the following exemplary equation wherein the estrogenic steroid is estradiol-17β, and the hexahaloacetone is hexafluoroacetone. In the structural formula for the product, the bond attaching the 2-hydroxy-perhalo-2-isopropyl group to the 2-position of the steroid nucleus is not intended to indicate stereochemical configuration, and the solid bond is used in the formula to denote α or β configuration.

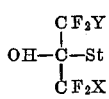

+ (CF₃)₂CO ⟶

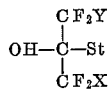

The hexahaloacetone compounds which may be utilized in the preparation of the new steroids of this invention include hexafluoroacetone, pentafluoromonochloroacetone, and sym. tetrafluorodichloroacetone.

The estrogenic steroids suitable for the preparation of the new 2-substituted estrogenic steroids of this invention are those having an aromatic A ring, a hydroxy group in the 3 position, and a free 2 position, and include, for example, estradiol, estrone, estriol, equilin, equilenin, and their epimers. Estradiol-17β (1,3,5-estratriene-3, 17β-diol), a commercially available estrogenic steroid, is particularly suitable for the preparation of 2-substituted estrogenic steroids of this invention.

While the ratio in which the reagents may be reacted with each other is not critical, it is preferred to use an excess of hexahaloacetone, preferably about 1.2 to 2 mols of hexahaloacetone per mol of steroid compound. If the reaction is carried out employing significantly higher or lower mol ratios, undesirable contamination of the product may occur.

While the reaction may be carried out in the absence of a catalyst, the use of a sulfonic acid catalyst enables the reaction to proceed at a faster rate and is therefore preferred. Suitable sulfonic acid catalysts are alkyl or aryl sulfonic acids, as e.g., methanesulfonic acid, ethanesulfonic acid, propanesulfonic acid, methanedisulfonic acid, benzenesulfonic acid, toluenesulfonic acids, xylenesulfonic acids, and naphthalenesulfonic acids. Toluenesulfonic acids are preferred catalysts.

The catalyst is employed in amounts ranging from 0.1 to 10 percent by weight based on the amount of steroid compound charged. For economical operation it is preferred to employ the catalyst in an amount of from about 2 to 5 percent by weight based on the amount of steroid compound charged.

The reaction temperature may vary from room temperature to about 350° C., and is preferably about 50° to 150° C. If a solvent is employed as reaction medium, the reaction may be conveniently carried out at the reflux temperature of the reaction mixture.

In preferred operation, a solvent which is inert under the conditions of reaction is employed. Suitable solvents include benzene and its alkylated and halogenated derivatives, as for example toluene, xylene, and chlorobenzene. The amount of solvent is not critical, a suitable amount being employed to afford solution of the reactants under reaction conditions, preferably in the range of from about 1 to 5 parts by weight per part of steroid compound charged.

Recovery of the 2-substituted derivatives of the estrogenic steroids from the reaction mixture may be accomplished by conventional means, as for example, removal of the solvent by distillation to leave the product as residue, or by cooling of the reaction mixture to precipitate the product. The product may be further purified by recrystallization from a suitable solvent, as e.g., methyl or ethyl alcohol.

The following examples, in which parts are by weight, will further illustrate the preparation of the 2-substituted estrogenic steroids of this invention.

EXAMPLE I

Preparation of 2-(2-hydroxy-1,1,1,3,3,3-hexafluoroisopropyl) estradiol-17β

To 5 parts of estradiol-17β in 12 parts of toluene were added 0.2 part of toluenesulfonic acid and 3.5 parts of hexafluoroacetone. The mixture was refluxed for 5 hours until no further uptake of the hexafluoroacetone was observed. The mixture was cooled and taken up in 100 parts of ether. The ether solution was washed with water to remove unreacted hexafluoroacetone, was dried with magnesium sulfate, and was then concentrated to a small volume from which upon cooling precipitated 5.4 parts of crude product. The crude product was purified by recrystallization from methyl alcohol. The purified 2-(2-hydroxy - 1,1,1,3,3,3-hexafluoroisopropyl) estradiol-17β had a melting point of 116° C. The assigned structure was verified by infra-red and elemental analysis.

EXAMPLE II

Preparation of 2-(2-hydroxy-1,1,3,3-tetrafluoro-1,3-dichloroisopropyl) estradiol-17β

A solution of 2.8 parts of estradiol-17β and 0.1 part of toluenesulfonic acid in 12 parts of toluene was heated to 100° C. To this solution was added a solution of 2 parts of sym. tetrafluorodichloroacetone in 3.5 parts of toluene dropwise over a period of 30 minutes. During the tetrafluorodichloroacetone addition the temperature of the reaction mixture was maintained above 70° C. Upon completion of the tetrafluorodichloroacetone addition the toluene was removed from the reaction mixture by vacuum distillation. The residue was recrystallized from aqueous ethyl alcohol to give a quantitative yield of 2-(2-hydroxy-1,1,3,3-tetrafluoro - 1,3 - dichloroisopropyl) estradiol-17β. The assigned structure was confirmed by infrared and elemental analysis.

The 2-substituted steroids of this invention are effective estrogenic agents. Estrogenic potency, against estrone as a standard, was determined by bioassay using the mouse uterine response according to the method of Rubin et al. reported in Endocrinology, 49, 429, (1951). For this assay groups of 21 to 22 day old female albino mice were injected subcutaneously once daily for three days with the test compound or the reference standard estrone. The total dose was contained in 0.3 m. of sesame oil. Twenty-four hours after the last injection the animals were sacrificed and uterine and body weights of the mice were determined. The uterine ratio was calculated as the uterine weight in mg. divided by the body weight in grams. Test results are shown in the following tables.

TABLE I.—BIOASSAY OF 2-(2-HYDROXYL-1,1,3,3-TETRAFLUORO-1,3-DICHLOROISOPROPYL) ESTRADIOL-17β

| Material administered | Total dose, µg. | No. of mice | Mean uterine ratio+S.E. |
|---|---|---|---|
| 0 | 0 | 8 | 1.04±.05 |
| Estrone [1] (standard). | .05 | 8 | 2.00±.13 |
|  | .10 | 8 | 3.14±.43 |
|  | .20 | 8 | 4.31±.18 |
|  | .40 | 8 | 4.91±.24 |
| Test compound | .005 | 8 | 1.31±.08 |
|  | .015 | 8 | 2.17±.11 |
|  | .05 | 8 | 4.41±.41 |

[1] Estrone, 1,3,5-estratriene-3-ol-17-one, is a commercially available natural estrogenic steroid.

TABLE II.—BIOASSAY OF 2-(2-HYDROXY-1,1,1,3,3,3-HEXAFLUOROISOPROPYL) ESTRADIOL-17β

| Material administered | Total dose, µg. | No. of mice | Mean uterine ratio+S.E. |
|---|---|---|---|
| 0 | 0 | 8 | .74±.04 |
| Estrone | .05 | 8 | 1.84±.10 |
|  | .10 | 8 | 2.96±.30 |
|  | .20 | 8 | 4.41±.34 |
|  | .40 | 8 | 4.78±.15 |
| Test compound | .0005 | 8 | 1.06±.07 |
|  | .0015 | 8 | 1.56±.15 |
|  | .0045 | 8 | 2.69±.16 |

The above results show that 2-(2-hydroxy-1,1,1,3,3,3-hexafluoroisopropyl) estradiol-17β is about 5 times as potent as estrone, while 2-(2-hydroxy-1,1,3,3-tetrafluoro-1,3-dichloroisopropyl) estradiol-17β is about 18 times as active as the same standard.

Various changes and modifications may be made in carrying out the present invention without departing from the spirit and scope thereof. Insofar as these changes and modifications are within the purview of the annexed claims, they are to be considered as part of my invention.

What is claimed is:

1. A compound of the formula

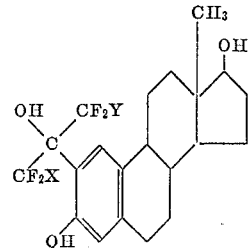

wherein X and Y are members selected from the group consisting of fluorine and chlorine.

2. 2-(2-hydroxy-1,1,3,3 - tetrafluoro - 1,3 - dichloroisopropyl) estradiol-17β.

3. 2-(2-hydroxy - 1,1,1,3,3,3-hexafluoroisopropyl) estradiol-17β.

4. A process for preparing compounds of the structure

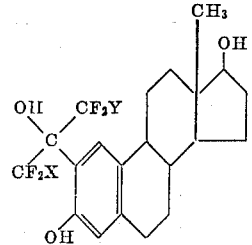

wherein X and Y are members selected from the group consisting of fluorine and chlorine, which comprises reacting an estradiol with a hexahaloacetone compound having the general formula $CO(CF_2X)(CF_2Y)$ wherein X and Y are members selected from the group consisting of fluorine and chlorine, and recovering the product from the reaction mixture.

5. The process of claim 4 wherein reactants are reacted in the presence of a sulfonic acid catalyst.

6. The process of claim 4 wherein the reactants are reacted in the presence of a sulfonic acid catalyst selected from the group consisting of alkylsulfonic acids and arylsulfonic acids.

No references cited

HENRY A. FRENCH, Primary Examiner

U.S. Cl. X.R.

260—397.4, 397.45, 999